United States Patent [19]

Schimmel et al.

[11] Patent Number: 4,620,966

[45] Date of Patent: Nov. 4, 1986

[54] PROCESS FOR DEFLUORINATING ALKALI METAL PHOSPHATE SOLUTIONS

[75] Inventors: Günther Schimmel; Herbert Ressel; Gero Heymer, all of Erftstadt; Reinhard Gradl, Hürth, all of Fed. Rep. of Germany

[73] Assignee: Hoechst Aktiengesellschaft, Frankfurt, Fed. Rep. of Germany

[21] Appl. No.: 619,057

[22] Filed: Jun. 11, 1984

[30] Foreign Application Priority Data

Jun. 23, 1983 [DE] Fed. Rep. of Germany ....... 3322503

[51] Int. Cl.$^4$ ............................................. C01B 25/16
[52] U.S. Cl. .................................... 423/185; 423/309
[58] Field of Search ................ 423/185, 312, 313, 309

[56] References Cited

U.S. PATENT DOCUMENTS

| 1,456,594 | 5/1923 | Howard | 423/185 |
| 2,053,319 | 9/1936 | Block et al. | 423/185 |
| 2,271,712 | 2/1942 | Pierce | 423/185 |
| 3,055,733 | 9/1962 | Lang et al. | 423/185 |

FOREIGN PATENT DOCUMENTS

| 573592 | 4/1959 | Canada | 423/185 |
| 724440 | 8/1980 | U.S.S.R. | 423/312 |

*Primary Examiner*—John Doll
*Assistant Examiner*—Wayne A. Langel
*Attorney, Agent, or Firm*—Connolly and Hutz

[57] ABSTRACT

The disclosure relates to a process for defluorinating alkali metal phosphate solutions. To this end, the disclosure provides for an alkali metal phosphate solution neutralized to a pH-value of more than 6 and pre-purified to be stirred at 60° to 120° C. into an alkaline earth metal compound. Alkaline earth metal compounds with a solubility in water of less than 5 g/l are used in the form of particles of which more than 50% have a size of less than 8 μm. After a reaction period of 0.5 to 4 hours, the precipitate obtained is separated from the purified alkali metal phosphate solution.

6 Claims, No Drawings

PROCESS FOR DEFLUORINATING ALKALI METAL PHOSPHATE SOLUTIONS

The present invention relates to a process for making alkali metal phosphate solutions containing little fluorine from prepurified alkali metal phosphate solutions obtained by processing a phosphate ore with sulfuric acid, separating resulting gypsum from the crude wet-processed phosphoric acid, neutralizing the said crude acid by means of an alkali to a pH-value higher than 6, and filtering off precipitated matter from the alkali metal phosphate solution so treated.

Wet-processed phosphoric acid is obtained on subjecting apatite minerals to treatment with sulfuric acid and separating resulting calcium sulfate. This is crude phosphoric acid which has the bulk of cationic contaminants originating from the ore dissolved in it and which contains fluoride originating from the apatite mineral, in the form of HF and/or $H_2SiF_6$. Various attempts have therefore been made to reduce the F-content in phosphoric acid or phosphate solutions, which substantially provide for the fluoride to be either expelled in gaseous form or for it to be precipitated as solid matter, from an acid solution. In the first case, the acid is customarily treated with steam and HF and/or $SiF_4$ are allowed to escape (cf. German Specification DE-OS No. 28 22 303). In the second case, the fluoride is precipitated in the acid medium, normally in the form of $Na_2SiF_6$, by the addition of either sodium or silicon ions or both, in stoichiometric proportions (cf. German Specification DE-PS No. 16 67 435). A disadvantage which is common to all of these processes resides in the fact that either considerable energy, i.e. steam, or an expensive stripping means is required to be used, while precipitation in an acid medium enables the F-content to be reduced insufficiently only, owing to the high solubility of the salt.

In DE-PS No. 16 67 435, for example, which provides for $Na_2SiF_6$ to be precipitated, the residual concentration is still as high as 0.2% $F/P_2O_5$. As disclosed in U.S. Pat. No. 4,026,995, it is also possible for the fluorine present in phosphoric acid to be precipitated as $CaF_2$ by the addition of calcium sulfate, the residual concentration being in this case at best 0.3% $F/P_2O_5$.

The removal of fluoride ions from neutral phosphate solutions has also been tried. In German Specification DE-OS No. 26 35 893, for example, crude phosphoric acid is first extractively purified with the use of amyl alcohol; next, it is reextracted and an extensively decontaminated phosphoric acid is obtained which is further purified by precipitating it with the use of sodium hydroxide solution, the sodium phosphate solution so treated having a pH-value of 6.5 to 7 and containing about 20% $P_2O_5$ but not more than about 20 ppm $F^-$. This sodium phosphate solution is further treated using a large excess of solid hydroxyl apatite and/or tertiary calcium phosphate permitting the $F^-$-content to be further reduced to a few ppm F.

A disadvantage associated with this process is the use of expensive synthetic hydroxyl apatite which incidentally has to be used in a considerable stoichiometric excess. Thus, for example, $Ca^{2+}$ is required to be used in a proportion which is 42 times the molar proportion of $F^-$ in order to reduce the F-content from initially 152.6 ppm to 17.3 ppm. In addition to this, the process just described is rendered expensive by the fact that the purification is effected in two stages, namely by extraction and precipitation.

By purifying the crude acid by precipitation with the use of an alkali, e.g. sodium hydroxide solution, it is possible almost quantitatively to precipitate the cationic contaminants; the alkali metal phosphate solution obtained after separation of the precipitated solid matter (metal phosphates and hydroxides) is in fact sufficiently pure for a variety of uses, but it still has an unsatisfactory high content of F (cf. German Specification DE-PS No. 20 35 505).

As disclosed in U.S. Pat. No. 2,271,712, a disodium solution containing little fluorine is obtained in all those cases in which the purification by precipitation is effected in three stages. This however is a technically very expensive procedure since it is necessary for the neutralized suspension to be filtered intermediarily, each time after establishment of a Na/P-ratio of 0.16:1 and about 1:1, respectively. As indicated in U.S. Pat. No. 2,271,712, the neutralization in a single stage is considerably easier to carry out technically, but it yields disodium phosphate with a relatively high content of fluorine therein.

It is therefore the goal of this invention to provide a process, wherein a prepurified alkali metal phosphate solution obtained from crude wet-processed phosphoric acid by exclusively subjecting the crude acid to neutralization in a single stage to a pH-value higher than 6, is effectively defluorinated to a residual $F^-$-content low enough for the most various commercial uses.

This goal can unexpectedly be achieved by the present process which comprises more particularly: stirring the prepurified alkali metal phosphate solution at 60°–120° C. into a compound of an alkaline earth metal Me with a solubility in water at 20° C. of more than 0.01 mol $Me^{2+}$/l, alkaline earth metal compounds with a solubility in water of less than 5 g/l being used in the form of particles of which more than 50% have a size of less than 8 μm, allowing the whole to react over a period of 0.5 to 4 hours, and separating resulting precipitate from the purified alkali metal phosphate solution.

The alkaline earth metal compounds of low solubility in water should preferably be selected from fine particulate, alkaline earth metal oxides or hydroxides, especially CaO or $Ca(OH)_2$. They are added in the form of solid matter whilst the alkaline earth metal compounds of high solubility in water, such as $MgNO_3$ or $Ca(NO_3)_2$, for example, should preferably be added as an aqueous solution.

It is good practice to use the alkaline earth metal compound in 2 to 20 times the stoichiometric quantity, based on the formation of the corresponding alkaline earth metal fluoride. The precipitate obtained after the reaction and separated from the purified alkali metal phosphate solution should preferably be washed out with warm water and recycled to the phosphate ore processing stage for recovery of the $P_2O_5$ contained in the precipitate.

The process of this invention offers a series of advantages and complies with two basic specifications, namely to ensure a good defluorination efficiency with the use of relatively little material, and combines this with a high filtration output during the spearation of the neutral to alkaline filter cake containing fluoride.

On being stirred into a fluoride-containing sodium phosphate solution (molar ratio $PO_4/F \sim 100:1$), the alkaline earth metal compounds are not exclusively converted to calcium phosphate as would have been expected, but are even predominantly converted to alkaline earth metal fluoride. In the event of the cation being $Ca^{2+}$, for example, the defluorination efficiency is the better the finer the particle size of the compound and the higher its solubility. $Ca(OH)_2$, for example, produces better results than CaO of identical fineness of grinding. Coarse $Ca(OH)_2$ on the other hand is extremely less active than finer material (cf. Examples 10 and 7).

Soluble salts, e.g. $Ca(NO_3)_2$ or $Mg(NO_3)_2$, if used as an aqueous solution, indeed have a slightly improved specific defluorination efficiency, but they compare unfavorably with the oxides or hydroxides, in respect of the following points:

(a) they introduce foreign anionic contaminants into the phosphate solution;
(b) they affect the filterability of the suspension;
(c) they effect the inclusion of more $P_2O_5$ in the filter cake;
(d) they are higher in price, based on an identical quantity of cations in the form of oxides or hydroxides.

Completely water-insoluble compounds, e.g. finely ground limestone, were inefficient (cf. Example 11).

As shown in the following Examples, it is the reaction temperature which is of vital importance to the process (cf. Examples 4, 7 and 8). The use of a reaction temperature lower than 60° C. results inter alia in an unsatisfactory defluorination efficiency and in the formation of an extremely ill-filterable and ill-washable filter cake. Increasing the temperature with the other parameters remaining unchanged results in distinctly more fluoride becoming removed.

In the event of the contact period selected being too short or too long, the degree of $F^-$-reduction is adversely affected in the first case by an incomplete reaction, and in the second case by the occurrence of redissolution phenomena (cf. Examples 7 and 9). Any contamination of the phosphate salt solution by alkaline earth metal ions was not observed.

As can be inferred from the above statements, a commercially very attractive method of carrying out the present invention provides for a most finely divided alkaline earth metal hydroxide to be used at temperatures of more than 80° C. at a contact period of 2-3 hours. $Mg^{2+}$ compares unfavorably with $Ca^{2+}$ in the occurrence of slight post-precipitation phenomena in the phosphate solution over days.

The technically beneficial effects of the process of this invention can be summarized as follows:

(1) High $F^-$-reduction with the use of relatively little alkaline earth metal chemicals
(2) Use of inexpensive alkaline earth metals
(3) Little expenditure of apparatus
(4) High space/time-yields due to very good filtration output
(5) No contamination of phosphate solution by cations The following Examples illustrate the invention which is naturally not limited thereto.

Kola-phosphate was processed with sulfuric acid, sodium sulfate and $SiO_2$ were added, gypsum was filtered off, and crude phosphoric acid containing about 0.25% F and 28% $P_2O_5$ was obtained. The acid was neutralized with sodium hydroxide solution to a pH of 8.5 and a purified disodium phosphate solution was obtained which was separated from precipitated contaminants.

In the following experiments, two different purified solutions containing 496 ppm (Examples 1 to 14) and 205 ppm (Examples 15 and 16), respectively, but in each case 19% $P_2O_5$, were used.

800 g solution was in each case stirred into the alkaline earth metal specified at different temperatures and over different periods, using a magnetic stirring rod. Next, the whole was filtered while hot using a pressure filter (F=80 cm²) covered with a polypropylene needle felt. X-ray photographs of the filter cake showed that $F^-$ was exclusively present in the form of $CaF_2$.

Determined were the filtration period and F-content of the filtrate treated. Examples 8 to 12 relate to a prior process and are given for the purpose of comparison.

| Ex. No. | Alkaline earth metal compound Type | Quantity $Me^{2+}$ in g | % proportion $<8/um^d$ | Stirring period in hrs | Temp. in °C. | Approx. Filtration output in l/m² | ppm F in purified phosphate solution |
|---|---|---|---|---|---|---|---|
| 1 | CaO | 2.1 | 56 | 3 | 80 | 3000 | 250 |
| 2 | CaO | 2.1 | 100 | 3 | 80 | 3000 | 230 |
| 3 | $Ca(OH)_2$ | 0.85 | 81 | 2 | 100 | 2500 | 110 |
| 4 | $Ca(OH)_2$ | 2.1 | 81 | 2 | 100 | 2000 | 94 |
| 5 | $Ca(OH)_2$ | 4.2 | 81 | 2 | 100 | 2000 | 85 |
| 6 | $Ca(OH)_2$ | 8.4 | 81 | 2 | 100 | 2000 | 30 |
| 7 | $Ca(OH)_2$ | 2.1 | 81 | 2 | 80 | 2000 | 170 |
| $8^{a,c}$ | $Ca(OH)_2$ | 2.1 | 81 | 2 | 40 | <50 | 350 |
| $9^a$ | $Ca(OH)_2$ | 2.1 | 81 | 5 | 80 | 3000 | 340 |
| $10^a$ | $Ca(OH)_2$ | 2.1 | 25 | 2 | 80 | 3000 | 380 |
| $11^a$ | $CaCO_3$ | 2.1 | 62 | 2 | 80 | 3000 | 490 |
| $12^a$ | $Ca_5(PO_4)_3OH^e$ | 2.1 | 68 | 2 | 80 | 1500 | 370 |
| 13 | $Mg(OH)_2$ | 1.3 | 53 | 2 | 80 | 300 | 120 |
| $14^b$ | $Ca(NO_3)_2$ | 2.1 | — | 1 | 80. | 1200 | 140 |
| 15 | $Ca(OH)_2$ | 4.2 | 81 | 2 | 100 | 2000 | 25 |
| $16^b$ | $Ca(NO_3)_2$ | 4.2 | — | 2 | 100 | 1200 | 5 |

$^a$comparative Example
$^b Ca(NO_3)_2 \cdot 4H_2O$ dissolved in 20 ml $H_2O$
$^c$filtered off at 80° C.
$^d$Determined on "Microtrac-Particle Size Analyzer" in kerosene
$^e$Prepared as described in DE-OS 26 35 893

We claim:

1. In the process for producing alkali metal phosphate solutions being essentially free from fluorine from prepurified, fluorine-containing alkali metal phosphate solutions obtained by processing a phosphate ore with sulfuric acid, separating resulting gypsum from the crude wet-processed phosphoric acid, reacting the said crude acid with an alkali solution and filtering off precipitated matter from the alkali metal phosphate solution so obtained, the improvement which comprises
  (a) neutralizing the crude acid to a pH-value higher than 6, essentially to the dialkali metal phosphate stage, and filtering off the precipitated matter from the resultant pre-purified dialkali metal phosphate solution;
  (b) stirring said phosphate solution at 60°–120° C. with an agent consisting essentially of a compound of an alkaline earth metal Me having a solubility in water at 20° C. of more than 0.01 mol $Me^{2+}/l$ and separating resulting second precipitate from the dialkali metal phosphate solution being essenitally free from fluorine;
  (c) alkaline earth metal compounds having a solubility in water of less than 5 g/l being used in the form of particles of which more than 50% have a size of less than 8 μm and the whole being allowed to react over a period of 0.5 to 4 hours before filtering off precipitated matter.

2. The process as claimed in claim 1, wherein the alkaline earth metal compound of low solubility in water is a fine particulate alkaline earth metal hydroxide or oxide.

3. The process as claimed in claim 1, wherein the alkaline earth metal compound of high solubility in water is used in the form of an aqueous solution which is added to alkali metal phosphate solution.

4. The process as claimed in claim 1, wherein the alkaline earth metal compound is used in 2 to 20 times the stoichiometric quantity necessary for the formation of the corresponding alkaline earth metal fluoride.

5. The process as claimed in claim 1, wherein the precipitated matter of step (a), along with phosphate ore, is treated with sulfuric acid to produce wet-processed phosphoric acid.

6. The process as claimed in claim 1, wherein the separated precipitated matter of steps (b) or (c) is washed with water before a treatment with sulfuric acid.

* * * * *